United States Patent
Nuzum et al.

(10) Patent No.: US 10,679,201 B2
(45) Date of Patent: Jun. 9, 2020

(54) PERSONAL POINT OF SALE (PPOS) DEVICE THAT PROVIDES FOR CARD PRESENT E-COMMERCE TRANSACTION

(71) Applicant: NXP B.V., Eindhoven (NL)

(72) Inventors: Todd Raymond Nuzum, Omaha, NE (US); Melissa A. Hunter, Austin, TX (US); Derek Alan Snell, Indianapolis, IN (US); Suresh Palliparambil, San Ramon, CA (US); Patrick Ryan Comiskey, Lake Saint Louis, MO (US); Michael Dow, Austin, TX (US)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 15/344,508

(22) Filed: Nov. 4, 2016

(65) Prior Publication Data

US 2018/0130040 A1  May 10, 2018

(51) Int. Cl.
  *G06Q 20/20* (2012.01)
  *G06Q 20/34* (2012.01)
  *G06Q 20/32* (2012.01)

(52) U.S. Cl.
  CPC ......... *G06Q 20/204* (2013.01); *G06Q 20/327* (2013.01); *G06Q 20/3226* (2013.01); *G06Q 20/34* (2013.01)

(58) Field of Classification Search
  CPC . G06Q 20/204; G06Q 20/3226; G06Q 20/327
  See application file for complete search history.

(56) References Cited

U.S. PATENT DOCUMENTS

| 5,721,781 A | 2/1998 | Deo et al. |
| 6,112,987 A | 9/2000 | Lambert et al. |

(Continued)

FOREIGN PATENT DOCUMENTS

| CN | 202003442 U | 10/2011 |
| GB | 2524946 A | 10/2015 |

(Continued)

OTHER PUBLICATIONS

"Secure cryptoprocessor". As last edited by "jpbowen". Retrieved from: https://en.wikipedia.org/w/index.php?title=Secure_cryptoprocessor&oldid=721306220 Revision date: May 20, 2016.*

(Continued)

*Primary Examiner* — Nathan A Mitchell

(57) ABSTRACT

Within the EMV payment specification, the use of an unattended terminal to accept a payment is allowed. Creating a device that has both the EMV level 1 (L1) and level 2 (L2) payment components combined with a virtual merchant creates a "card present" transaction for an on-line or e-commerce merchant. This device can be called a personal Point of Sale (pPOS). This specification discloses personal Point of Sale (pPOS) devices and methods that can provide for card present e-commerce transactions. In some embodiments, a pPOS device can include only a secure microcontroller function (MCF), a payment kernel, a secure element, and an interface to an external system with an EMV level 3 (L3) payment application. In some embodiments, a pPOS device can further include a reader. In some embodiments, a pPOS device can still further include a sensor switch and/or a user interface function.

28 Claims, 10 Drawing Sheets

(56) References Cited

U.S. PATENT DOCUMENTS

| | | |
|---|---|---|
| 6,587,838 B1 | 7/2003 | Esposito et al. |
| 6,615,194 B1 | 9/2003 | Deutsch et al. |
| 6,889,198 B2 | 5/2005 | Kawan |
| 6,978,933 B2 | 12/2005 | Yap et al. |
| 6,983,882 B2 | 1/2006 | Cassone |
| 7,500,616 B2 | 3/2009 | Beenau et al. |
| 8,229,358 B2 | 7/2012 | Caudevilla Laliena et al. |
| 8,240,561 B2 | 8/2012 | Busch-Sorensen |
| 8,706,032 B2 | 4/2014 | Zhang et al. |
| 8,807,440 B1 | 8/2014 | von Behren et al. |
| 8,965,398 B2 | 2/2015 | Zhu et al. |
| 8,985,442 B1 | 3/2015 | Zhou et al. |
| 9,026,459 B2 * | 5/2015 | Fisher .................. H04W 4/21 |
| | | 705/16 |
| 9,027,102 B2 | 5/2015 | Katzer et al. |
| 9,092,766 B1 * | 7/2015 | Bedier .................. G06Q 20/204 |
| 9,294,268 B2 | 3/2016 | Von Mueller et al. |
| 9,312,923 B2 | 4/2016 | Lyne et al. |
| 9,317,845 B1 * | 4/2016 | Ekselius ............... G06Q 20/204 |
| 9,332,432 B2 | 5/2016 | Low et al. |
| 9,704,355 B2 * | 7/2017 | Beatty ................. G07G 1/0009 |
| 2002/0163421 A1 | 11/2002 | Wang et al. |
| 2009/0164327 A1 | 6/2009 | Bishop et al. |
| 2009/0187492 A1 | 7/2009 | Hammad et al. |
| 2009/0307142 A1 * | 12/2009 | Mardikar ............. G06Q 20/1085 |
| | | 705/72 |
| 2012/0022914 A1 | 1/2012 | Edward et al. |
| 2012/0084210 A1 | 4/2012 | Farahmand |
| 2012/0109829 A1 | 5/2012 | McNeal et al. |
| 2013/0179351 A1 * | 7/2013 | Wallner ............... G06Q 20/34 |
| | | 705/71 |
| 2013/0282502 A1 | 10/2013 | Jooste |
| 2014/0040149 A1 | 2/2014 | Fiske |
| 2014/0058937 A1 | 2/2014 | Watson |
| 2014/0114853 A1 | 4/2014 | Guedj |
| 2014/0136354 A1 | 5/2014 | Emery et al. |
| 2014/0279565 A1 | 9/2014 | Trump et al. |
| 2014/0310113 A1 | 10/2014 | Sengupta |
| 2014/0324698 A1 | 10/2014 | Dolcino et al. |
| 2015/0046216 A1 | 2/2015 | Adjaoute |
| 2015/0058224 A1 | 2/2015 | Gaddam et al. |
| 2015/0287031 A1 * | 10/2015 | Radu .................. G06K 7/10009 |
| | | 705/18 |
| 2015/0339659 A1 * | 11/2015 | Ballesteros ........ G06Q 20/3229 |
| | | 705/76 |
| 2015/0348001 A1 | 12/2015 | Van Os et al. |
| 2016/0063480 A1 | 3/2016 | Ballesteros |
| 2016/0092876 A1 | 3/2016 | Kamal et al. |
| 2017/0061441 A1 * | 3/2017 | Kamal .............. G06Q 20/40145 |
| 2017/0076269 A1 * | 3/2017 | Saeed .................. G06Q 20/206 |
| 2017/0103382 A1 * | 4/2017 | Kim .................... G06Q 20/3278 |
| 2017/0109399 A1 | 4/2017 | Stearn et al. |
| 2017/0109509 A1 | 4/2017 | Baghdasaryan |
| 2017/0109620 A1 * | 4/2017 | Wurmfeld ........ G06K 19/07722 |
| 2017/0178100 A1 * | 6/2017 | Bergeon ............... G06Q 20/202 |
| 2017/0200144 A1 * | 7/2017 | Chatterton .......... G06Q 20/3224 |
| 2017/0221056 A1 * | 8/2017 | Karpenko ........ G06Q 20/38215 |
| 2017/0278096 A1 | 9/2017 | Chitalia et al. |
| 2017/0317987 A1 * | 11/2017 | Vijayasankar ...... H04L 63/0428 |
| 2017/0357970 A1 | 12/2017 | Muftic |
| 2017/0357973 A1 * | 12/2017 | Van Os ................ G06Q 20/327 |
| 2018/0033013 A1 * | 2/2018 | Park .................... G06Q 20/325 |
| 2018/0089691 A1 | 3/2018 | Sibert et al. |
| 2018/0144334 A1 * | 5/2018 | Fontaine ............ G06Q 20/3278 |
| 2018/0165759 A1 | 6/2018 | Carrington et al. |
| 2018/0268390 A1 | 9/2018 | Nuzum et al. |
| 2018/0365679 A1 | 12/2018 | Nuzum et al. |

FOREIGN PATENT DOCUMENTS

| | | |
|---|---|---|
| GB | 2529872 A | 3/2016 |
| WO | 00/26838 | 5/2000 |
| WO | 2008/103880 A2 | 8/2008 |
| WO | 2010/033967 A1 | 3/2010 |
| WO | 2010/128442 A2 | 11/2010 |
| WO | 2013/126996 A1 | 9/2013 |
| WO | 2015/080689 A1 | 6/2015 |
| WO | 2016/122457 A1 | 8/2016 |

OTHER PUBLICATIONS

Non-Final Office Action for U.S. Appl. No. 15/462,904 dated May 31, 2019; 25 Pages.
U.S. Appl. No. 15/995,033, filed May 31, 2018.
U.S. Appl. No. 15/783,876, filed Oct. 13, 2017.
Non-Final Office Action for U.S. Appl. No. 15/462,904 dated Dec. 12, 2019; 12 Pages.
Non-Final Office Action for U.S. Appl. No. 15/783,876 dated Jan. 21, 2020; 57 pages.
Non-Final Office Action for U.S. Appl. No. 15/995,033 dated Mar. 3, 2020; 62 Pages.

* cited by examiner

PERSONAL POINT OF SALE (PPOS) DEVICE THAT PROVIDES FOR CARD PRESENT E-COMMERCE TRANSACTION

FIELD

The described embodiments relate generally to devices and methods that provide for e-commerce transactions, and more particularly to personal Point of Sale (pPOS) devices and methods that provide for card present e-commerce transactions.

BACKGROUND

Today e-commerce transactions are processed as "card not present". This means the customer has to enter their card account number, printed security features on the card like CVC/CVC2 (card verification code/card validation code). This data is used and stored by the merchant to make the payment. This is customer PCI (Payment Card Industry) data. The merchant also pays a higher interchange rate because of the type of fraud which is possible because the data is exposed in the transaction and at the merchant web site.

Alternatively, "card present" e-commerce transactions can overcome problems or disadvantages associated with "card not present" e-commerce transactions. Therefore, it is desirable to have devices and methods that can provide for "card present" e-commerce transactions.

SUMMARY

Within the EMV payment specification, the use of an unattended terminal to accept a payment is allowed. Creating a device that has both the EMV level 1 (L1) and level 2 (L2) payment components combined with a virtual merchant creates a "card present" transaction for an on-line or e-commerce merchant. This device can be called a personal Point of Sale (pPOS). (Note: EMV stands for Europay, MasterCard, and Visa.)

This specification discloses personal Point of Sale (pPOS) devices and methods that can provide for card present e-commerce transactions. In some embodiments, personal Point of Sale (pPOS) is a device that can provide a Point of Sale (POS) for card present e-commerce transactions. In some embodiments, the pPOS device is owned by the customer or provide by the merchant allowing the customer to create, store and validate the user (which is the customer) via customer validation methods (CVM) and data elements on the device. In some embodiments, the CVM data elements can be a simple tap sequence, biometrics, PKI (public key infrastructure), authentication application, or any other smart card application or service. In some embodiments, the pPOS device can also allow the merchant to configure the transaction flow to meet their authentication requirements for a specific transaction based on dollar amount, customer, or product type or services. The merchant can determine if a higher or lower authentication requirements is needed and enforces these requirements in data elements and parameter changes via the EMV (EMV stands for Europay, MasterCard, and Visa) payment process flow. In some embodiments, the device also supports Point to Point encryption (P2PE) and End to End encryption (E2EE). These encryption capabilities protect the customer's PCI data at rest and in transit. In some embodiments, the device can support both contact and/or contactless EMV transactions from payment cards, mobile phones and wearables. This removes the need for a customer to enter their credit or debit account number on merchant's e-commerce web site.

The present invention discloses a device for providing a personal point of sale (pPOS) for card present e-commerce transactions, the device comprising: a secure microcontroller function (MCF), a reader, a payment kernel, a secure element, a sensor switch. The reader is configured to read a payment and/or identity instrument. The payment kernel is configured to process payment. The secure element is configured to store and process payment and identification application. The sensor switch is configured to initiate and/or terminate a transaction.

In some embodiments, the secure MCF is configured to provide application and data level encryption and hardware/software tamper detection.

In some embodiments, the reader is a certified EMV level 1 contact and/or contact less reader, wherein EMV stands for Europay, MasterCard, and Visa.

In some embodiments, an antenna of the reader is enabled in a pPOS device enclosure, stand alone, or integrated into an external device, wherein the external device is one of the following: wireless charging, WiFi (wireless local area network) communication, Bluetooth or Bluetooth low energy communication, near field magnetic induction (NFMI) communication, cellular communication.

In some embodiments, a user allows the payment kernel to be configured by a merchant and/or merchant acquirer for a merchant payment or a user authentication transaction.

In some embodiments, the payment kernel is EMV level 2 certified for contact and/or contact less transaction, wherein EMV stands for Europay, MasterCard, and Visa.

In some embodiments, the secure element is configured to execute a secure element application that is used for payment and/or authentication.

In some embodiments, the sensor switch is further configured to collect user authentication data and notify a user of a device status.

In some embodiments, the device further comprises a user interface function. The user interface function provides a status of the device and a state of the transaction, wherein the user interface function uses one or more of the following interfaces: a visual display, a light, a series of lights, an audio interface, a haptics interface.

In some embodiments, the secure MCF and/or a second MCF is configured to perform I/O (input/output) functions.

In some embodiments, the secure element application performs authentication using a multi-factor authentication method.

In some embodiments, the sensor switch comprises a biometric sensor. The biometric sensor is used to collect user biometric data for enrollment and authentication of: the user of the device, and/or the transaction from the device to a merchant and/or a merchant acquirer.

In some embodiments, the biometric data is managed by the user of the device.

In some embodiments, the sensor switch comprises a touch sensor. The touch sensor is used to collect user created data for enrollment and authentication of: the user of the device, and/or the transaction from the device to a merchant and/or a merchant acquirer.

In some embodiments, a touch pattern is managed by the user of the device.

In some embodiments, the secure element is further configured to execute a second secure element application that is used for customer biometric storage and validation.

In some embodiments, the secure MCF and/or the second MCF is configured to perform I/O (input/output) functions with a certified EMV level 3 (L3) payment application, wherein EMV stands for Europay, MasterCard, and Visa.

In some embodiments, the secure MCF and/or the second MCF is configured to perform I/O (input/output) functions with the certified EMV level 3 (L3) payment application using one or more of the following: USB (Universal Serial Bus), audio jack, Bluetooth, WiFi (wireless local area network), NFC (near field communication), near field magnetic induction (NFMI) communication, a remote MCF, any computer network.

In some embodiments, a customer initiates the transaction by presenting the payment and/or identity instrument to the device.

In some embodiments, the identity instrument enables authentication of a user and is comprised of one or more of the following: a face of the user, a finger of the user, a fingerprint of the user, an iris of the user, a voice of the user, a heart rhythm of the user, a physical attribute of the user.

In some embodiments, a merchant initiates the transaction from an external system that requires a payment and/or authentication from a user.

The present invention also discloses a method for providing a personal point of sale (pPOS) for card present e-commerce transactions, the method comprising: (a) initiating, by a user and/or a merchant, a request for a payment transaction; (b) presenting, by the user, an instrument to a pPOS device, wherein no instrument data is entered into a website, a web page, or a mobile application; (c) authenticating and validating, by the pPOS device, the instrument for the merchant and/or an issuer of the instrument; (d) processing, by the pPOS device, the payment transaction.

In some embodiments, the instrument is a payment instrument and/or an identity instrument.

In some embodiments, the payment instrument comprises one of the following: a card form factor, a mobile phone, a wearable.

In some embodiments, the identity instrument is comprised of one or more of the following: a face of the user, a finger of the user, a fingerprint of the user, an iris of the user, a voice of the user, a heart rhythm of the user, a physical attribute of the user.

The present invention further discloses a device comprising: a secure microcontroller function (MCF), a payment kernel, and a secure element. The payment kernel is configured to process payment. The secure element is configured to store and process payment and identification application.

In some embodiments, the secure MCF and/or a second MCF is configured to perform I/O (input/output) functions.

In some embodiments, the secure MCF and/or the second MCF is configured to perform I/O (input/output) functions with one or more of the following: a reader, a certified EMV level 3 (L3) payment application, wherein EMV stands for Europay, MasterCard, and Visa, a sensor switch, and a user interface function. The reader is configured to read a payment and/or identity instrument. The sensor switch is configured to initiate and/or terminate a transaction.

The above summary is not intended to represent every example embodiment within the scope of the current or future Claim sets. Additional example embodiments are discussed within the Figures and Detailed Description below.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Representative devices and methods according to the present application are described in this section. These examples are being provided solely to add context and aid in the understanding of the described embodiments. It will thus be apparent to one skilled in the art that the described embodiments may be practiced without some or all of these specific details. In other instances, well known process steps or device details have not been described in detail in order to avoid unnecessarily obscuring the described embodiments. Other embodiments are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Figure 1:
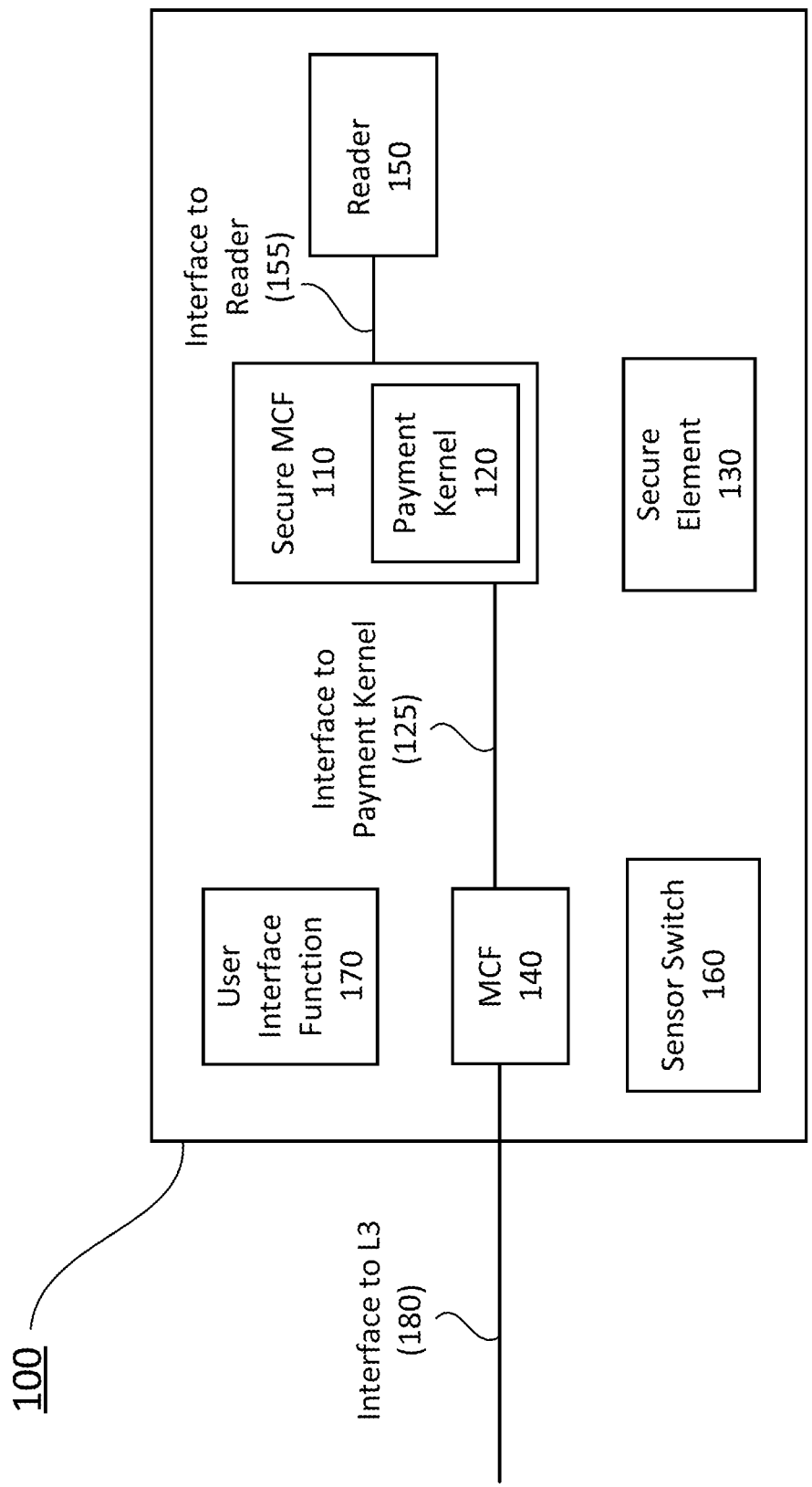
FIG. 1 shows a personal Point of Sale (pPOS) device that can provide for card present e-commerce transactions, in accordance with some example embodiments.

FIG. 1 shows a personal Point of Sale (pPOS) device 100 that is configured to provide for card present e-commerce transactions. FIG. 1 shows that the pPOS device 100 includes a secure microcontroller function (MCF) 110, a payment kernel 120 (which is contained in the secure MCF 110), a secure element 130, a second MCF 140, a reader 150, a sensor switch 160, and a user interface function 170. FIG. 1 also shows that the pPOS device 100 includes an interface 180 to a certified EMV level 3 (L3) payment application (where EMV stands for Europay, MasterCard, and Visa), an interface 125 between the secure MCF 110 and the second MCF 140, and an interface 155 between the secure MCF 110 and the reader 150. The pPOS device 100 can also include other interfaces, but these are not shown in detail in order to avoid unnecessarily obscuring the described embodiments.

In FIG. 1, the secure MCF 110 can be configured to provide application and data level encryption and hardware/software tamper detection. The payment kernel 120 is contained in the secure MCF 110, and can be configured to process payment. In some embodiments, a user can allow the payment kernel 120 to be configured by a merchant and/or merchant acquirer for a merchant payment or a user authentication transaction. In some embodiments, the payment kernel 120 can be EMV level 2 certified for contact and/or contact less transaction, where EMV stands for Europay, MasterCard, and Visa.

In FIG. 1, the secure element 130 can be configured to store and process payment and identification application. In some embodiments, the secure element 130 can be configured to execute a secure element application that is used for payment and authentication. In some embodiments, the secure element application can perform authentication using a multi-factor authentication method. In some embodiments, the secure element application can perform authentication using a multi-factor authentication method via PKI (public key infrastructure) and FIDO (Fast IDentity Online). In some embodiments, the secure element 130 can be further configured to execute a second secure element application that is used for customer biometric storage and validation.

In FIG. 1, the pPOS device 100 also includes a second MCF 140. In some embodiments, the secure MCF 110 and/or a second MCF 140 can be configured to perform I/O (input/output) functions. In some embodiments, the secure MCF 100 and/or the second MCF 140 can be configured to perform I/O (input/output) functions with a certified EMV level 3 (L3) payment application, where EMV stands for Europay, MasterCard, and Visa. In FIG. 1, these I/O functions with the EMV level 3 payment application can be performed via the interface 180. In some embodiments, the secure MCF 110 and/or the second MCF 140 can be configured to perform I/O (input/output) functions with the certified EMV level 3 payment application using one or more of the following: USB (Universal Serial Bus), audio jack, Bluetooth, WiFi (wireless local area network), NFC (near field communication), near field magnetic induction (NFMI) communication, a remote MCF, and any computer network. Therefore, for example, the pPOS device 100 can perform I/O functions with the EMV level 3 payment application directly using any computer network (such as PAN (personal area network), LAN (local area network), WAN (wide area network), MAN (metropolitan area network), etc.) in a peer to peer configuration. Or, in another example, the pPOS device 100 can perform I/O functions with the EMV level 3 payment application indirectly using a remote MCF (in a peer to peer configuration or a tethering configuration). In such a case, the remote MCF can be a laptop computer, a desktop computer, a tablet computer, a smart phone, or any device that can access the internet. Further, the pPOS device 100 can be configured to interface with the remote MCF in a tethering configuration using the audio jack or one of these interface protocols: USB, Bluetooth, WiFi, NFC, NFMI.

In FIG. 1, the reader 150 can be configured to read a payment and/or identity instrument. In some embodiments, the reader 150 can be a certified EMV level 1 contact and/or contact less reader, where EMV stands for Europay, MasterCard, and Visa. In some embodiments, an antenna of the reader 150 can be enabled in a pPOS device enclosure or integrated into an external device. In some embodiments, the external device can be one of the following: wireless charging, WiFi (wireless local area network) communication, Bluetooth or Bluetooth low energy communication, near field magnetic induction (NFMI) communication, and cellular communication. In FIG. 1, the interface functions with the reader can be performed via the interface 155, which connects the reader 150 to the secure MCF 110. In some embodiments, the interface functions with the reader can be performed via other interfaces (not shown in FIG. 1), and with other elements of the pPOS device 100, such as the secure element 130.

In FIG. 1, the sensor switch 160 can be configured to initiate and/or terminate a transaction. In some embodiments, the sensor switch 160 can be further configured to collect user authentication data. In some embodiments, the sensor switch 160 can be further configured to collect user authentication data and notify a user of a device status.

In some embodiments, the sensor switch 160 includes a biometric sensor. In some embodiments, the biometric sensor is used to collect user biometric data for enrollment and authentication of the user of the device, and/or the transaction from the device to a merchant and/or a merchant acquirer. In some embodiments, the biometric data is managed by the user of the device. In some embodiments, the biometric data can be one or more of the following: a face of the user, a finger of the user, a fingerprint of the user, an iris of the user, a voice of the user, a heart rhythm of the user, a physical attribute of the user.

In some embodiments, the sensor switch 160 includes a touch sensor. In some embodiments, the touch sensor is used to collect user created data for enrollment and authentication of the user of the device, and/or the transaction from the device to a merchant and/or a merchant acquirer. In some embodiments, a touch pattern and a sequence data can be managed by the user of the device using the touch sensor.

In FIG. 1, the user interface function 170 can provide a status of the device and a state of the transaction. In some embodiments, the user interface function 170 can use one or more of the following interfaces: a visual display, a light, a series of lights, an audio interface, a haptics interface. In some embodiments, the user interface function 170 can also use other interfaces to provide a status of the device and a state of the transaction.

FIG. 1 shows that a pPOS device 100 can include a secure microcontroller function (MCF) 110, a payment kernel 120, a secure element 130, a second MCF 140, a reader 150, a sensor switch 160, a user interface function 170, and an interface 180 to a certified EMV level 3 (L3) payment application. It is not shown in FIG. 1, but in some embodiments a pPOS device can include only a secure microcontroller function (MCF) 110, a payment kernel 120, a secure element 130, and an interface 180 to a certified EMV level 3 payment application. In some embodiments, a pPOS device can further include a reader 150. In some embodiments, a pPOS device can further include a second MCF 140. In some embodiments, a pPOS device can still further include a sensor switch 160 and/or a user interface function 170. It is also understood that still other embodiments may be used, and changes may be made without departing from the spirit and scope of the described embodiments.

In some embodiments, a pPOS device can provide the following services or functions:
a. Enablement of Point to Point encryption (P2PE) or End to End (E2EE) encryption security
b. Reader to card CVM (customer validation methods) validation of issuer provided CVM data elements
c. Merchant selectable CVM and data elements based on transaction elements and rules
d. Merchant web site integration In some embodiments, a pPOS device can provide for device or transaction activation. For example, this can include tap and/or slide switches for customer creation and validate activation sequences.

Figure 2:
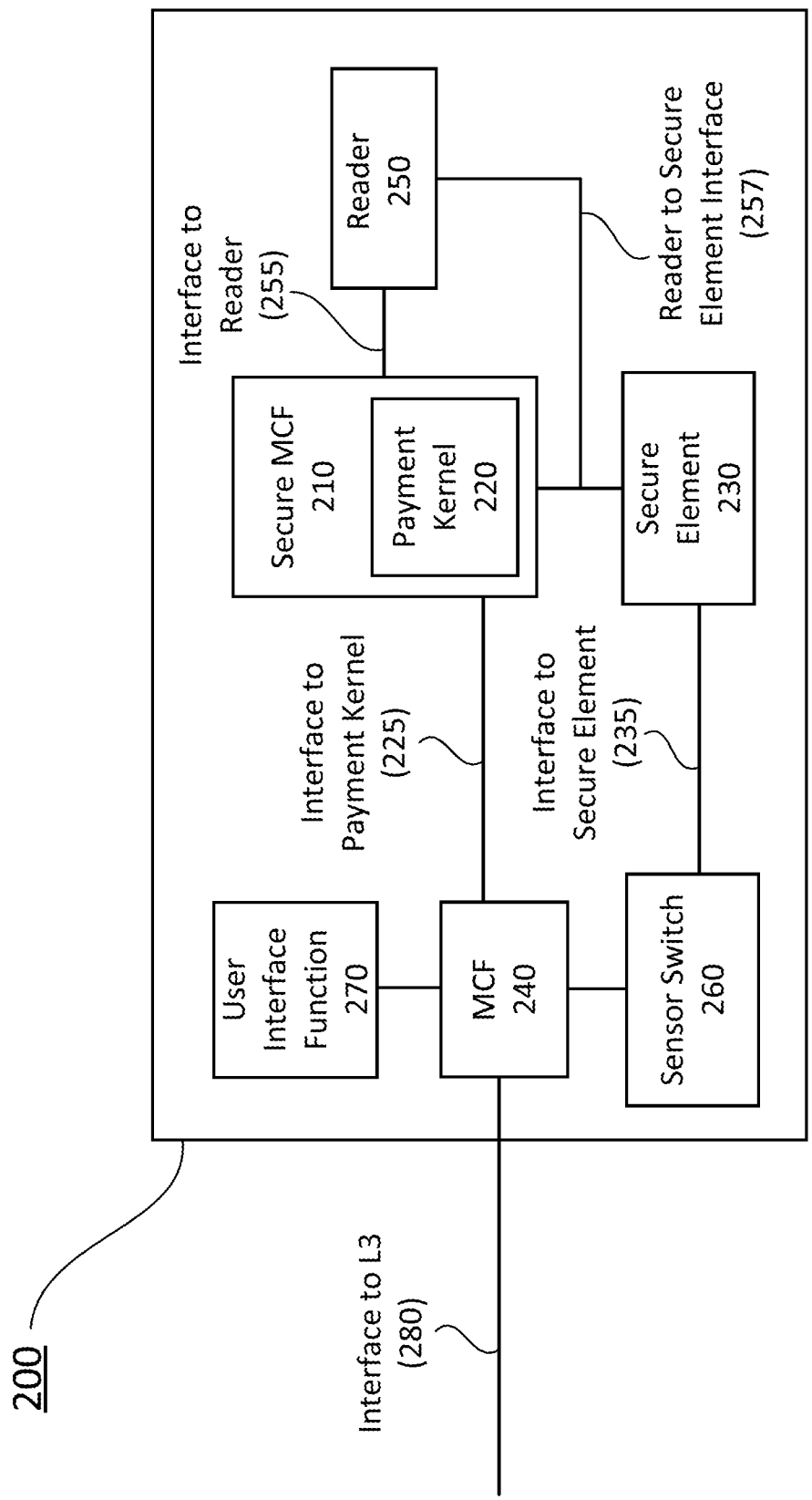
FIG. 2 shows a second personal Point of Sale (pPOS) device that can provide for card present e-commerce transactions, in accordance with some example embodiments.

In some embodiments, a pPOS device can provide the following features:
a. Storage of customer's CVMs in a secure element
b. CVM validation of customer CVM
c. Biometric sensors to collect customer biometric
d. Activation switches
e. Display of device status, merchant messages, issuer messages, and on card applet messages FIG. 2 shows a second personal Point of Sale (pPOS) device 200 that is configured to provide for card present e-commerce transactions. The FIG. 2 pPOS device 200 is similar to the FIG. 1 pPOS device 100, but the FIG. 2 pPOS 200 provides more details regarding the interfaces that can be used between the various elements of a pPOS device. In particular, FIG. 2 shows that the pPOS device 200 includes most elements that are similar to those elements shown in FIG. 1. For example, FIG. 2 shows that pPOS device 200 includes a secure microcontroller function (MCF) 210, a payment kernel 220 (which is contained in the secure MCF 210), a secure element 230, a second MCF 240, a reader 250, a sensor switch 260, and a user interface function 270. FIG. 2 also shows that the pPOS device 200 includes an interface 280 to a certified EMV level 3 (L3) payment application (where EMV stands for Europay, MasterCard, and Visa), an interface 225 between the secure MCF 210 and the second MCF 240, and an interface 255 between the secure MCF 210 and the reader 250. All of these elements shown in FIG. 2 can be matched with a corresponding element shown in FIG. 1 (for example: secure MCF 210 can be matched with secure MCF 110; payment kernel 220 can be matched with payment kernel 120; etc.). Furthermore, the functions and properties of the matching elements from the two FIGS. can be very similar or nearly identical (for example: secure MCF 210, like the matching secure MCF 110 from FIG. 1, can also be configured to provide application and data level encryption and hardware/software tamper detection).

Additionally, FIG. 2 also shows that the pPOS device 200 can include an interface 235 between the secure element 230 and the sensor switch 260, and an interface 257 between the reader 250 and the secure element 230. As an example, interface 235 between the secure element 230 and the sensor switch 260 can be used to help collect user biometric data, since the sensor switch 260 can include a biometric sensor, which is used to collect user biometric data for enrollment and authentication of the user of the device. As another example, interface 257 between the reader 250 and the secure element 230 can be used to help process payment and authentication of a card being read by reader 250, since the secure element 230 can be configured to execute a secure element application that is used for payment and authentication.

Figure 3A:
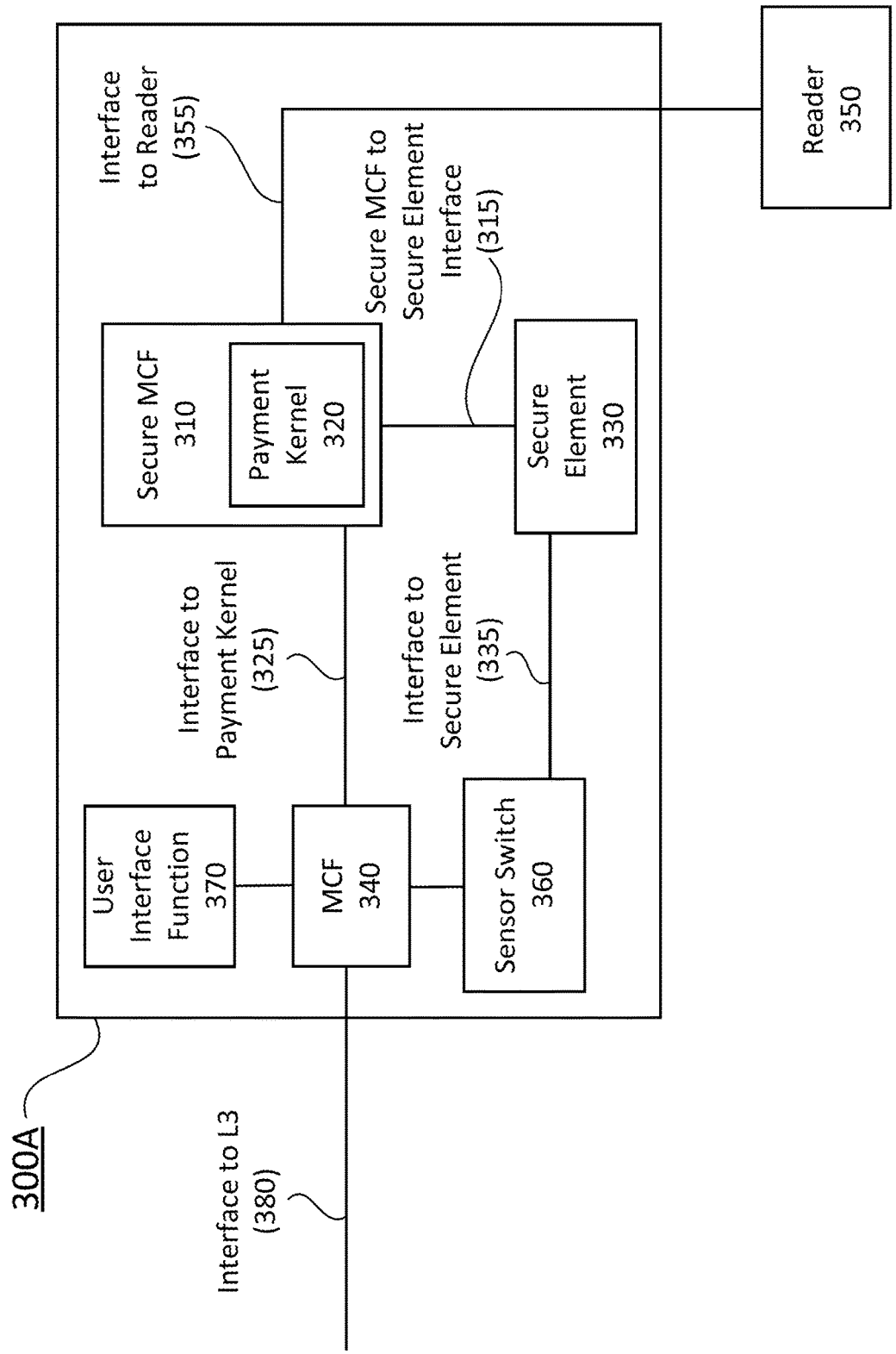
FIG. 3A shows a personal Point of Sale (pPOS) device that can provide for card present e-commerce transactions, where a reader is external to the pPOS device, in accordance with some example embodiments.

FIG. 3A shows a personal Point of Sale (pPOS) device 300A that can provide for card present e-commerce transactions, where a reader 350 is external to the pPOS device 300A. The FIG. 3A pPOS device 300A is similar to the FIG. 2 pPOS device 200, except the reader 350 is external to the pPOS device. In particular, FIG. 3A shows that the pPOS device 300A includes most elements that are similar to those elements shown in FIG. 2. For example, FIG. 3A shows that pPOS device 300A includes a secure microcontroller function (MCF) 310, a payment kernel 320 (which is contained in the secure MCF 310), a secure element 330, a second MCF 340, a sensor switch 360, and a user interface function 370. FIG. 3A also shows that the pPOS device 300A includes an interface 380 to a certified EMV level 3 (L3) payment application (where EMV stands for Europay, MasterCard, and Visa), an interface 325 between the secure MCF 310 and the second MCF 340, an interface 355 between the secure MCF 310 and the reader 350, an interface 335 between the sensor switch 360 and the secure element 330, and an interface 315 between the secure MCF 310 and the secure element 330. Again, all of these elements shown in FIG. 3A can be matched with a corresponding element shown in FIGS. 1 and 2 (for example: secure MCF 310 can be matched with secure MCF 110 and secure MCF 210, etc.). Furthermore, the functions and properties of the matching elements from the three FIGS. can be very similar or nearly identical (for example: secure MCF 310, like the matching secure MCF 110 from FIG. 1 and secure MCF 210 from FIG. 2, can also be configured to provide application and data level encryption and hardware/software tamper detection).

FIG. 3A also shows a reader 350, which is external to the pPOS device 300A. In some embodiments, the pPOS device 300A can be configured to perform I/O (input/output) functions with the reader 350 using one or more of the following: USB (Universal Serial Bus), audio jack, Bluetooth, WiFi (wireless local area network), NFC (near field communication), near field magnetic induction (NFMI) communication, a remote MCF, and any computer network. Therefore, for example, the pPOS device 300A can perform I/O functions with the reader 350 directly using any computer network (such as PAN (personal area network), LAN (local area network), WAN (wide area network), MAN (metropolitan area network), etc.) in a peer to peer configuration. Or, in another example, the pPOS device 300A can perform I/O functions with the reader 350 indirectly using a remote MCF (in a peer to peer configuration or a tethering configuration). In such a case, the remote MCF can be a laptop computer, a desktop computer, a tablet computer, a smart phone, or any device that can access the internet. Further, the pPOS device 300A can be configured to interface with the remote MCF in a tethering configuration using the audio jack or one of these interface protocols: USB, Bluetooth, WiFi, NFC, NFMI.

Additionally, unlike FIG. 2 (e.g., interface 257), FIG. 3A does not show a direct interface between the reader 350 and the secure element 330. In some embodiments, such a configuration to route the reader through the secure MCF 210 can be desirable, because of security reasons.

Figure 3B:
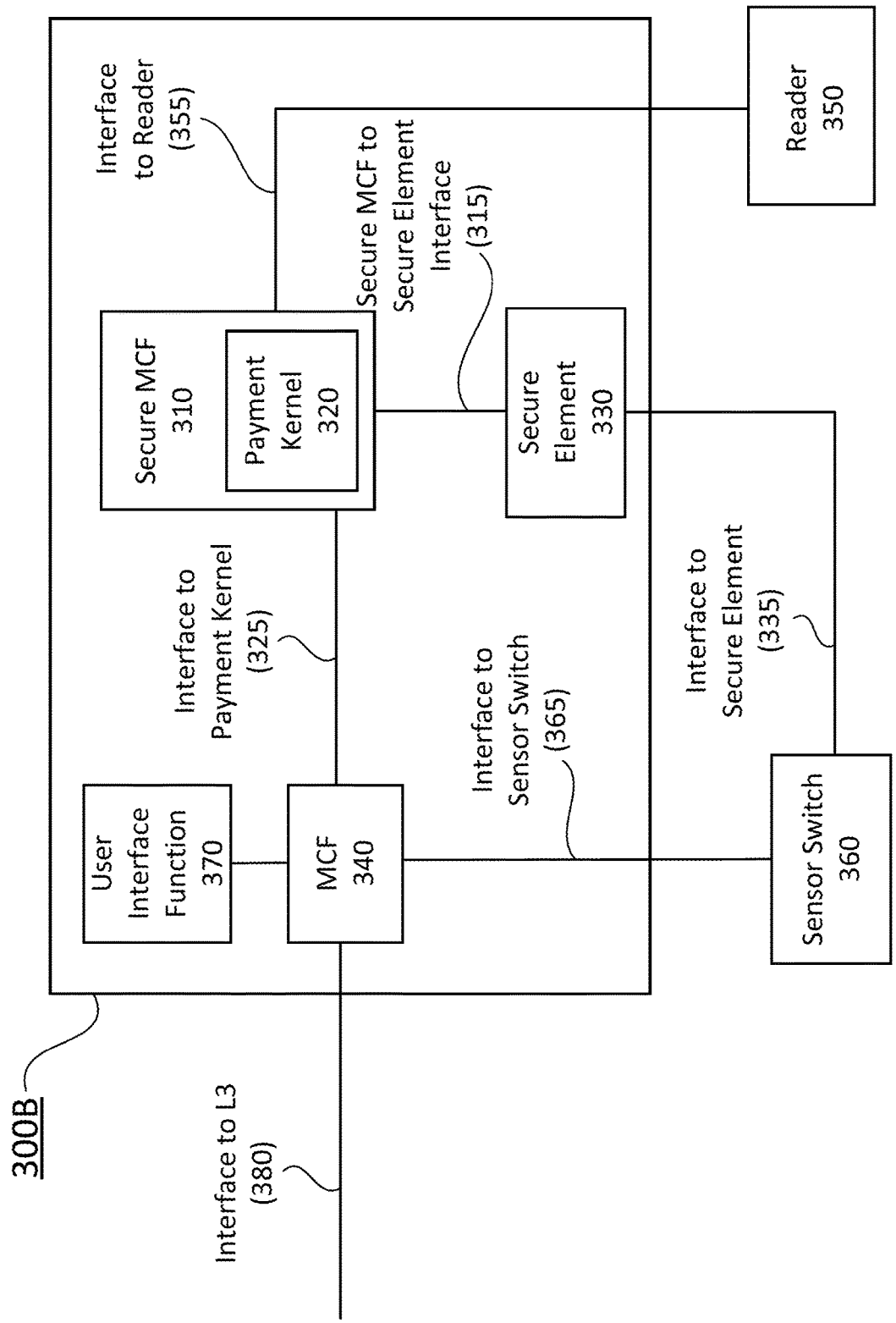
FIG. 3B shows a personal Point of Sale (pPOS) device that can provide for card present e-commerce transactions, where a reader and a sensor switch are external to the pPOS device, in accordance with some example embodiments.

FIG. 3B shows a personal Point of Sale (pPOS) device 300B that can provide for card present e-commerce transactions, where a reader and a sensor switch are external to the pPOS device 300B. The FIG. 3B pPOS device 300B is similar to the FIG. 2 pPOS device 200, except the reader 350 and the sensor switch 360 are external to the pPOS device. The FIG. 3B pPOS device 300B is similar to the FIG. 3A pPOS device 300A, except the sensor switch 360 is external to the pPOS device. In particular, FIG. 3B shows that the pPOS device 300B includes most elements that are similar to those elements shown in FIGS. 2 and 3A. FIG. 3B also shows that the pPOS device 300B includes interfaces that are similar to those shown in FIG. 3A. Again, the functions and properties of the matching elements and interfaces from the three FIGS. can be very similar or nearly identical.

FIG. 3B shows that the sensor switch 360 can be external to the pPOS device. In some embodiments, the pPOS device 300B can be configured to perform I/O (input/output) functions with the sensor switch 360 using one or more of the following: USB (Universal Serial Bus), audio jack, Bluetooth, WiFi (wireless local area network), NFC (near field communication), near field magnetic induction (NFMI) communication, a remote MCF, and any computer network. Therefore, for example, the pPOS device 300B can perform I/O functions with the sensor switch 360 indirectly using a remote MCF (in a peer to peer configuration or a tethering configuration). In such a case, the remote MCF can be a laptop computer, a desktop computer, a tablet computer, a smart phone, or any device that can access the internet. Further, the pPOS device 300B can be configured to interface with the remote MCF in a tethering configuration using the audio jack or one of these interface protocols: USB, Bluetooth, WiFi, NFC, NFMI. As a specific example to this, the pPOS device 300B can be connected to a laptop computer through a USB connection, and the sensor switch 360 can be a fingerprint reader of the laptop computer. Alternatively, in another example, if there is available a stand-alone sensor switch, then the pPOS device 300B can perform I/O functions with the sensor switch 360 directly using USB, audio jack, Bluetooth, WiFi, NFC, NFMI, or any computer network.

Additionally, like FIG. 3A (e.g., interface 335), FIG. 3B also shows a direct interface between the sensor switch 360 and the secure element 330. In some embodiments, such a configuration to directly route the sensor switch 360 to the secure element 330 can be undesirable for security reasons. Therefore, in some embodiments, the sensor switch 360 can be routed to the secure element 330 via the MCF 340 and/or the secure MCF 320, so that interface 335 is removed. However, if there are no security concerns and direct routing is possible, then the direct interface 335 might have some advantages of faster speed and simpler implementation.

Figure 3C:
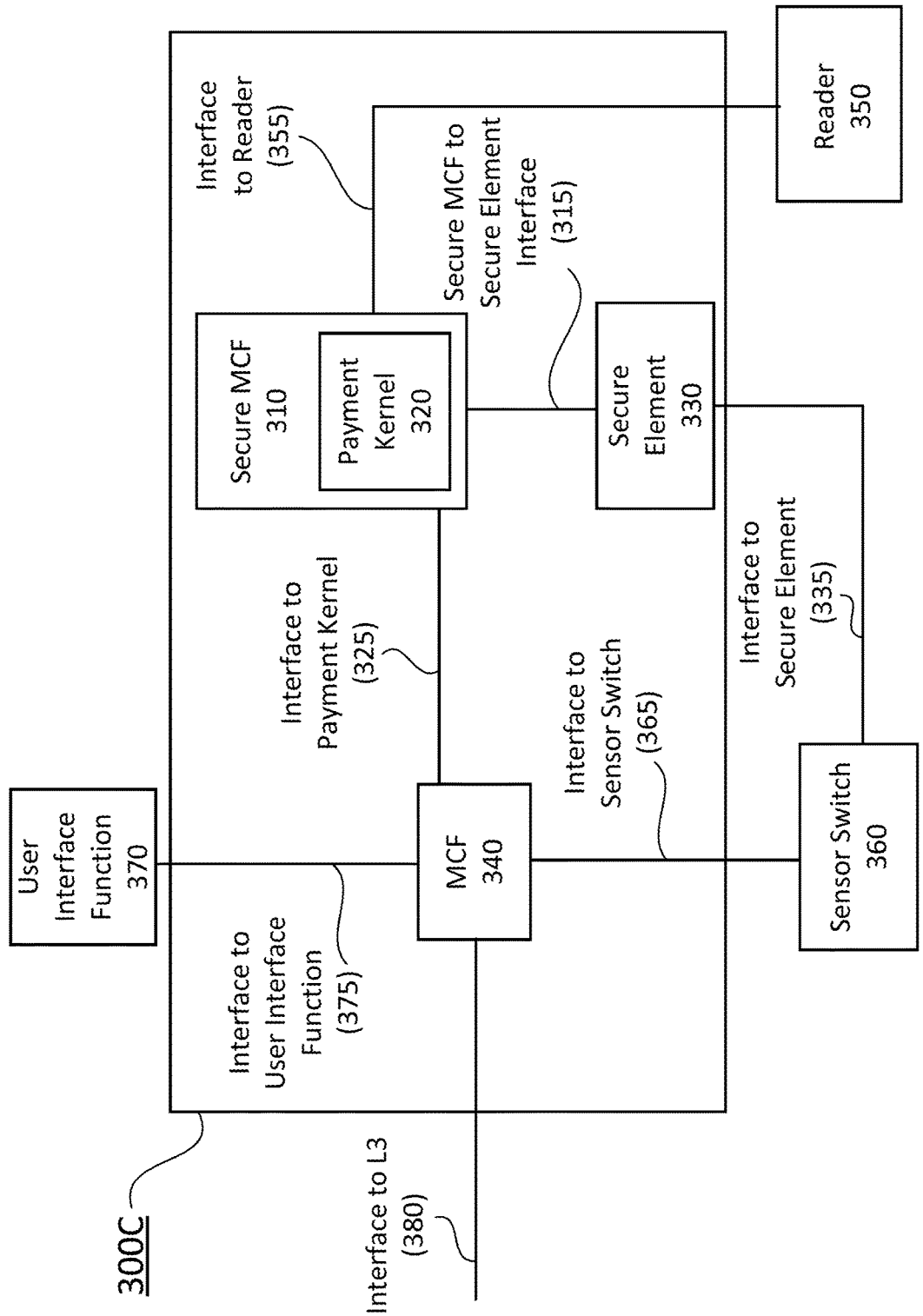
FIG. 3C shows a personal Point of Sale (pPOS) device that can provide for card present e-commerce transactions, where a reader, a sensor switch, and a user interface function are external to the pPOS device, in accordance with some example embodiments.

FIG. 3C shows a personal Point of Sale (pPOS) device 300C that can provide for card present e-commerce transactions, where a reader, a sensor switch, and a user interface function are external to the pPOS device 300C. The FIG. 3C pPOS device 300C is similar to the FIG. 2 pPOS device 200, except the reader 350, the sensor switch 360, and the user interface function 370 are all external to the pPOS device. The FIG. 3C pPOS device 300C is similar to the FIGS. 3A and 3B pPOS devices, except the user interface function 370 is external to the pPOS device. Again, all elements and interfaces shown in FIGS. 2, 3A, 3B, and 3C are similar, with very similar or nearly identical functions and properties for all matching elements and interfaces.

FIG. 3C shows that the user interface function 370 can be external to the pPOS device. In some embodiments, the pPOS device 300C can be configured to perform I/O (input/output) functions with the user interface function 370 using one or more of the following: USB (Universal Serial Bus), audio jack, Bluetooth, WiFi (wireless local area network), NFC (near field communication), near field magnetic induction (NFMI) communication, a remote MCF, and any computer network. Therefore, for example, the pPOS device 300C can perform I/O functions with the user interface function 370 indirectly using a remote MCF. In such a case, the remote MCF can be a laptop computer, a desktop computer, a tablet computer, a smart phone, or any device that can access the internet. Further, the pPOS device 300C can be configured to interface with the remote MCF in a tethering configuration using the audio jack or one of these interface protocols: USB, Bluetooth, WiFi, NFC, NFMI. As a specific example to this, the pPOS device 300C can be connected to a laptop computer through a USB connection, and the user interface function 370 can be a display screen of the laptop computer. Alternatively, in another example, if there is available a stand-alone user interface function, then the pPOS device 300C can perform I/O functions with the user interface function 370 directly using USB, audio jack, Bluetooth, WiFi, NFC, NFMI, or any computer network.

Figure 4:
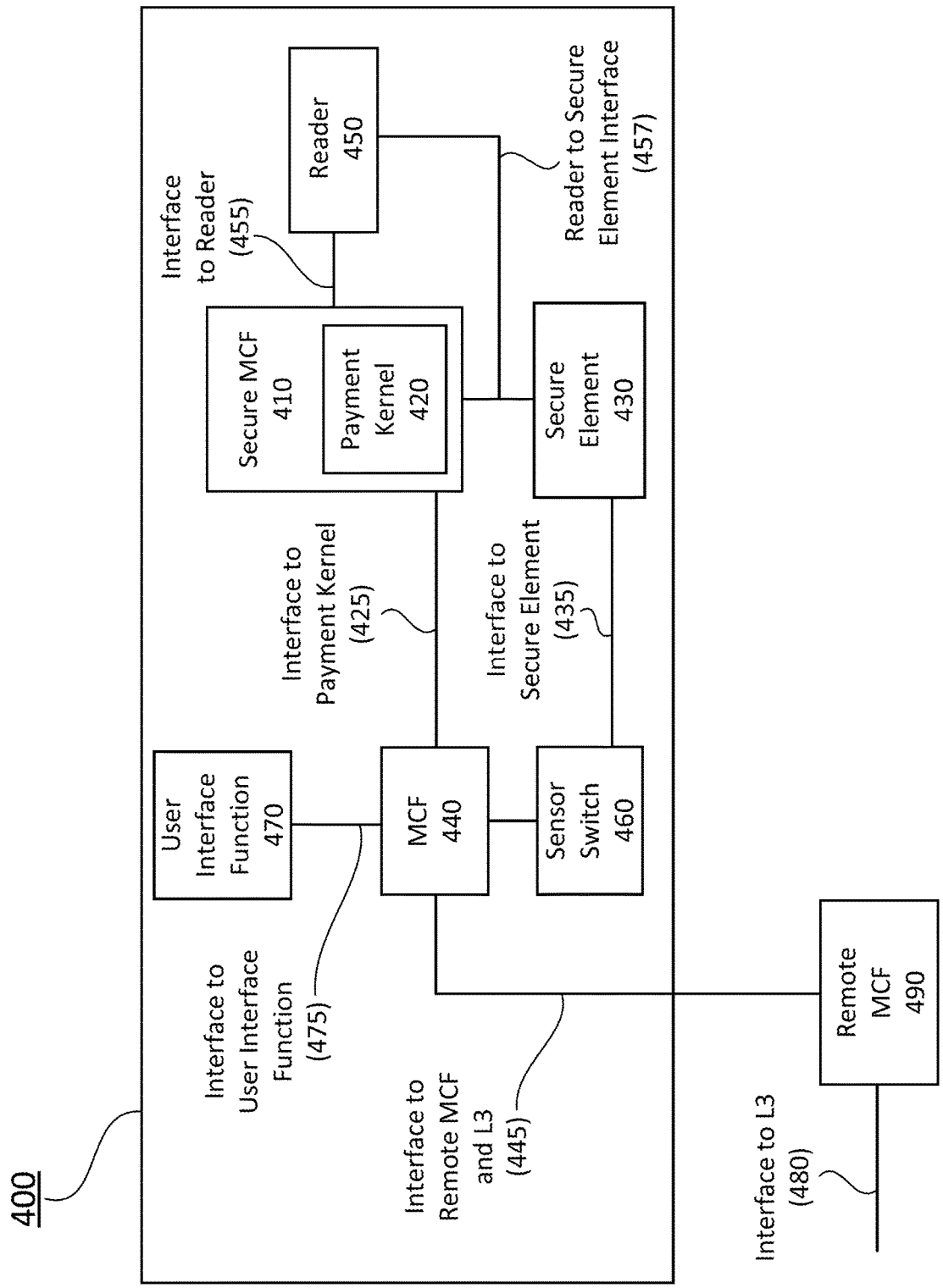
FIG. 4 shows a personal Point of Sale (pPOS) device that can provide for card present e-commerce transactions, where the pPOS device is interfaced with a certified EMV (EMV stands for Europay, MasterCard, and Visa) level 3 (L3) payment application via a remote MCF (microcontroller function), in accordance with some example embodiments.

FIG. 4 shows a personal Point of Sale (pPOS) device 400 that can provide for card present e-commerce transactions, where the pPOS device is interfaced with a certified EMV (EMV stands for Europay, MasterCard, and Visa) level 3 (L3) payment application via a remote MCF (microcontroller function). The FIG. 4 pPOS device 400 is similar to the FIG. 2 pPOS device 200, except the FIG. 4 pPOS device 400 is interfaced with a certified EMV level 3 payment application via a remote MCF 490. In some embodiments, the remote MCF 490 can be a laptop computer, a desktop computer, a tablet computer, a smart phone, or any device that can access the internet. Then pPOS device 400 can be interfaced with the remote MCF 490 in a tethering configuration using the audio jack or one of these interface protocols: USB, Bluetooth, WiFi, NFC, NFMI. In particular, FIG. 4 shows that the pPOS device 400 includes all elements and interfaces that are similar to those shown in FIG. 2. For example, FIG. 4 shows that pPOS device 400 includes a secure microcontroller function (MCF) 410, a payment kernel 420 (which is contained in the secure MCF 410), a secure element 430, a second MCF 440, a reader 450, a sensor switch 460, and a user interface function 470. FIG. 4 also shows that the pPOS device 400 includes an interface 445 to a remote MCF and a certified EMV level 3 payment application (where EMV stands for Europay, MasterCard, and Visa), an interface 425 between the secure MCF 410 and the second MCF 440, an interface 455 between the secure MCF 410 and the reader 450, an interface 435 between the sensor switch 460 and the secure element 430, an interface 475 between the MCF 440 and the user interface function 470, and an interface 457 between the reader 450 and the secure element 430. Again, all of the elements and interfaces shown in FIG. 4 can be matched with a corresponding element and interface shown in FIG. 2, and all matching elements and interfaces have very similar or nearly identical functions and properties.

FIG. 4 shows that pPOS device 400 can be interfaced with a certified EMV level 3 (L3) payment application via a remote MCF 490. In some embodiments, the remote MCF 490 can be a laptop computer, a desktop computer, a tablet computer, a smart phone, or any device that can access the internet. In some embodiments, the pPOS device 400 can be configured to interface with the remote MCF 490 using one or more of the following: USB (Universal Serial Bus), audio jack, Bluetooth, WiFi (wireless local area network), NFC (near field communication), near field magnetic induction (NFMI) communication, and any computer network. This means that interface 445 can be one or more of the following: USB, audio jack, Bluetooth, WiFi, NFC, NFMI, and any computer network.

In FIG. 4, the pPOS device 400 is interfaced with the remote MCF 490 through an interface 445 that is between the MCF 440 and the remote MCF 490. In some embodiments, the pPOS device 400 can be interfaced with the remote MCF 490 through another interface (not shown in FIG. 4) that connects the remote MCF 490 directly with the secure MCF 410.

Figure 5:
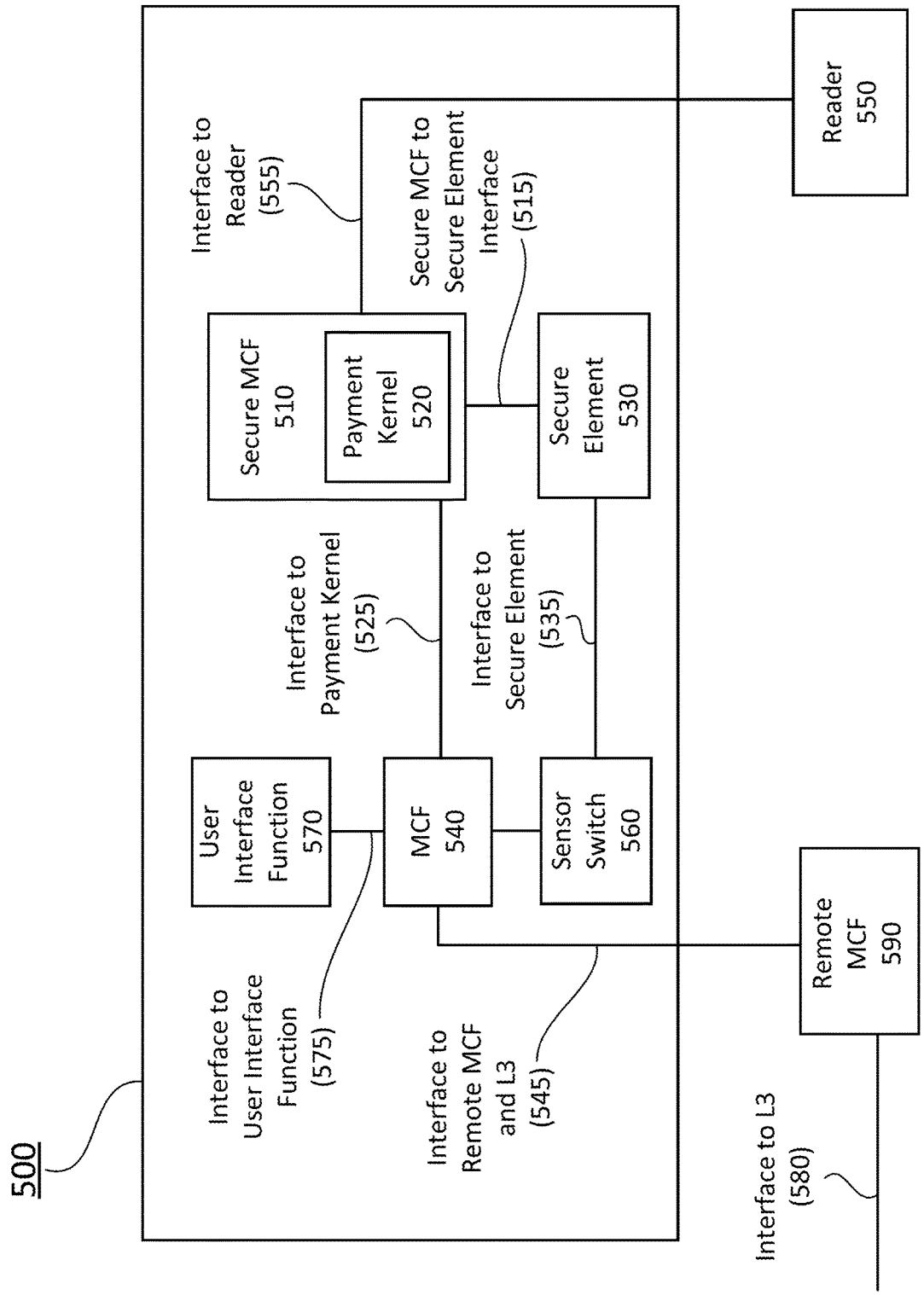
FIG. 5 shows a personal Point of Sale (pPOS) device that can provide for card present e-commerce transactions, where a reader is external to the pPOS device, and the pPOS device is interfaced with a certified EMV level 3 (L3) payment application via a remote MCF, in accordance with some example embodiments.

FIG. 5 shows a personal Point of Sale (pPOS) device 500 that can provide for card present e-commerce transactions, where a reader is external to the pPOS device, and the pPOS device is interfaced with a certified EMV level 3 (L3) payment application via a remote MCF. The FIG. 5 pPOS device 500 is similar to the FIG. 4 pPOS device 400, except the reader 550 is external to the pPOS device. In particular, FIG. 5 shows that the pPOS device 500 includes all elements and interfaces that are similar to those shown in FIG. 4. For example, FIG. 5 shows that pPOS device 500 includes a secure microcontroller function (MCF) 510, a payment kernel 520 (which is contained in the secure MCF 510), a secure element 530, a second MCF 540, a sensor switch 560, and a user interface function 570. FIG. 5 also shows that the pPOS device 500 includes an interface 545 to a remote MCF and a certified EMV level 3 payment application (where EMV stands for Europay, MasterCard, and Visa), an interface 525 between the secure MCF 510 and the second MCF 540, an interface 555 between the secure MCF 510 and the reader 550, an interface 535 between the sensor switch 560 and the secure element 530, an interface 575 between the MCF 540 and the user interface function 570, and an interface 515 between the secure MCF 510 and the secure element 530. Again, all of the elements and interfaces shown in FIG. 5 can be matched with a corresponding element and interface shown in FIG. 4 (except for interface 457), and all matching elements and interfaces have very similar or nearly identical functions and properties.

FIG. 5 shows that pPOS device 500 can be interfaced with a certified EMV level 3 (L3) payment application via a remote MCF 590. In some embodiments, the remote MCF 590 can be a laptop computer, a desktop computer, a tablet computer, a smart phone, or any device that can access the internet. In some embodiments, the pPOS device 500 can be configured to interface with the remote MCF 590 using one or more of the following: USB (Universal Serial Bus), audio jack, Bluetooth, WiFi (wireless local area network), NFC (near field communication), near field magnetic induction (NFMI) communication, and any computer network. This means that interface 545 can be one or more of the following: USB, audio jack, Bluetooth, WiFi, NFC, NFMI, and any computer network.

FIG. 5 also shows a reader 550, which is external to the pPOS device 500. In some embodiments, the pPOS device 500 can be configured to perform I/O (input/output) functions with the reader 550 using one or more of the following: USB (Universal Serial Bus), audio jack, Bluetooth, WiFi (wireless local area network), NFC (near field communication), near field magnetic induction (NFMI) communication, a remote MCF, and any computer network. Therefore, for example, the pPOS device 500 can perform I/O functions with the reader 550 directly using any computer network (such as PAN, LAN, WAN, MAN, etc.) in a peer to peer configuration. Or, in another example, the pPOS device 500 can perform I/O functions with the reader 550 indirectly using a remote MCF. In such a case, the remote MCF can be a laptop computer, a desktop computer, a tablet computer, a smart phone, or any device that can access the internet. Further, the pPOS device 500 can be configured to interface with the remote MCF in a tethering configuration using the audio jack or one of these interface protocols: USB, Bluetooth, WiFi, NFC, NFMI.

Additionally, unlike FIG. 4 (e.g., interface 457), FIG. 5 does not show a direct interface between the reader 550 and the secure element 530. In some embodiments, such a configuration to route the reader through the secure MCF 510 can be desirable, because of security reasons.

Figure 6:
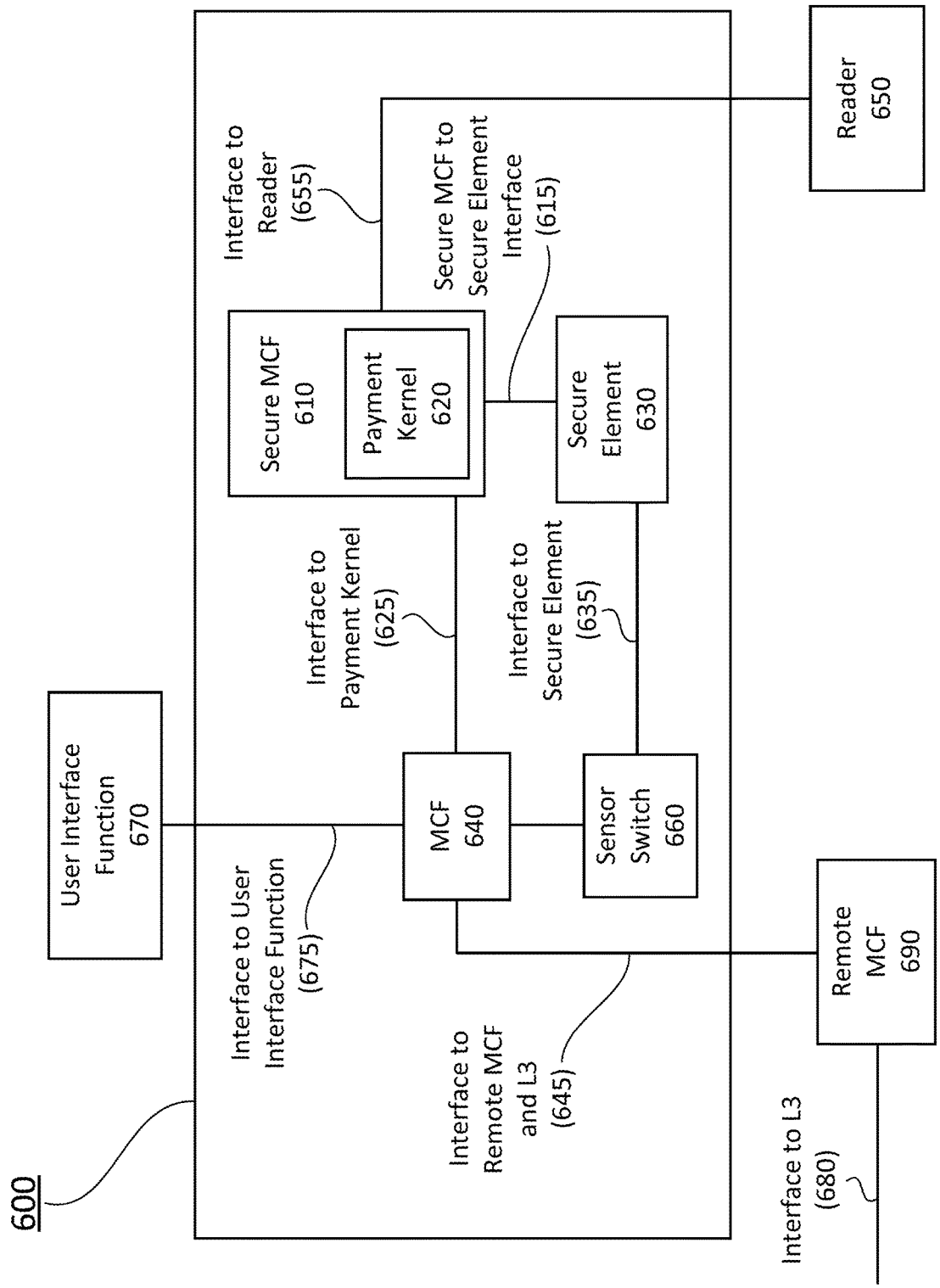
FIG. 6 shows a personal Point of Sale (pPOS) device that can provide for card present e-commerce transactions, where a reader and a user interface function are external to the pPOS device, and the pPOS device is interfaced with a certified EMV level 3 (L3) payment application via a remote MCF, in accordance with some example embodiments.

FIG. 6 shows a personal Point of Sale (pPOS) device 600 that can provide for card present e-commerce transactions, where a reader and a user interface function are external to the pPOS device, and the pPOS device is interfaced with a certified EMV level 3 (L3) payment application via a remote MCF. The FIG. 6 pPOS device 600 is similar to the FIG. 5 pPOS device 500, except the user interface function 670 is external to the pPOS device. In particular, FIG. 6 shows that the pPOS device 600 includes all elements and interfaces that are similar to those shown in FIG. 5. For example, FIG. 6 shows that pPOS device 600 includes a secure microcontroller function (MCF) 610, a payment kernel 620 (which is contained in the secure MCF 610), a secure element 630, a second MCF 640, and a sensor switch 660. FIG. 6 also shows that the pPOS device 600 includes an interface 645 to a remote MCF and a certified EMV level 3 payment application (where EMV stands for Europay, MasterCard, and Visa), an interface 625 between the secure MCF 610 and the second MCF 640, an interface 655 between the secure MCF 610 and the reader 650, an interface 635 between the sensor switch 660 and the secure element 630, an interface 675 between the MCF 640 and the user interface function 670, and an interface 615 between the secure MCF 610 and the secure element 630. Again, all of the elements and interfaces shown in FIG. 6 can be matched with a corresponding element and interface shown in FIG. 5, and all matching elements and interfaces have very similar or nearly identical functions and properties.

FIG. 6 shows that pPOS device 600 can be interfaced with a certified EMV level 3 payment application via a remote MCF 690. In some embodiments, the remote MCF 690 can be a laptop computer, a desktop computer, a tablet computer, a smart phone, or any device that can access the internet. In some embodiments, the pPOS device 600 can be configured to interface with the remote MCF 690 using one or more of the following: USB (Universal Serial Bus), audio jack, Bluetooth, WiFi (wireless local area network), NFC (near field communication), near field magnetic induction (NFMI) communication, and any computer network. This means that interface 645 can be one or more of the following: USB, audio jack, Bluetooth, WiFi, NFC, NFMI, and any computer network.

FIG. 6 shows that the reader 650 can be external to the pPOS device. In some embodiments, the pPOS device 600 can be configured to perform I/O (input/output) functions with the reader 650 using one or more of the following: USB (Universal Serial Bus), audio jack, Bluetooth, WiFi (wireless local area network), NFC (near field communication), near field magnetic induction (NFMI) communication, a remote MCF, and any computer network.

FIG. 6 shows that the user interface function 670 can be external to the pPOS device. In some embodiments, the pPOS device 600 can be configured to perform I/O (input/output) functions with the user interface function 670 using one or more of the following: USB (Universal Serial Bus), audio jack, Bluetooth, WiFi (wireless local area network), NFC (near field communication), near field magnetic induction (NFMI) communication, a remote MCF, and any computer network.

As an example to FIG. 6, the pPOS device 600 can be connected to a computer through a USB connection. Then, in some embodiments, the user interface function 670 can be a display screen of the computer.

Figure 7:
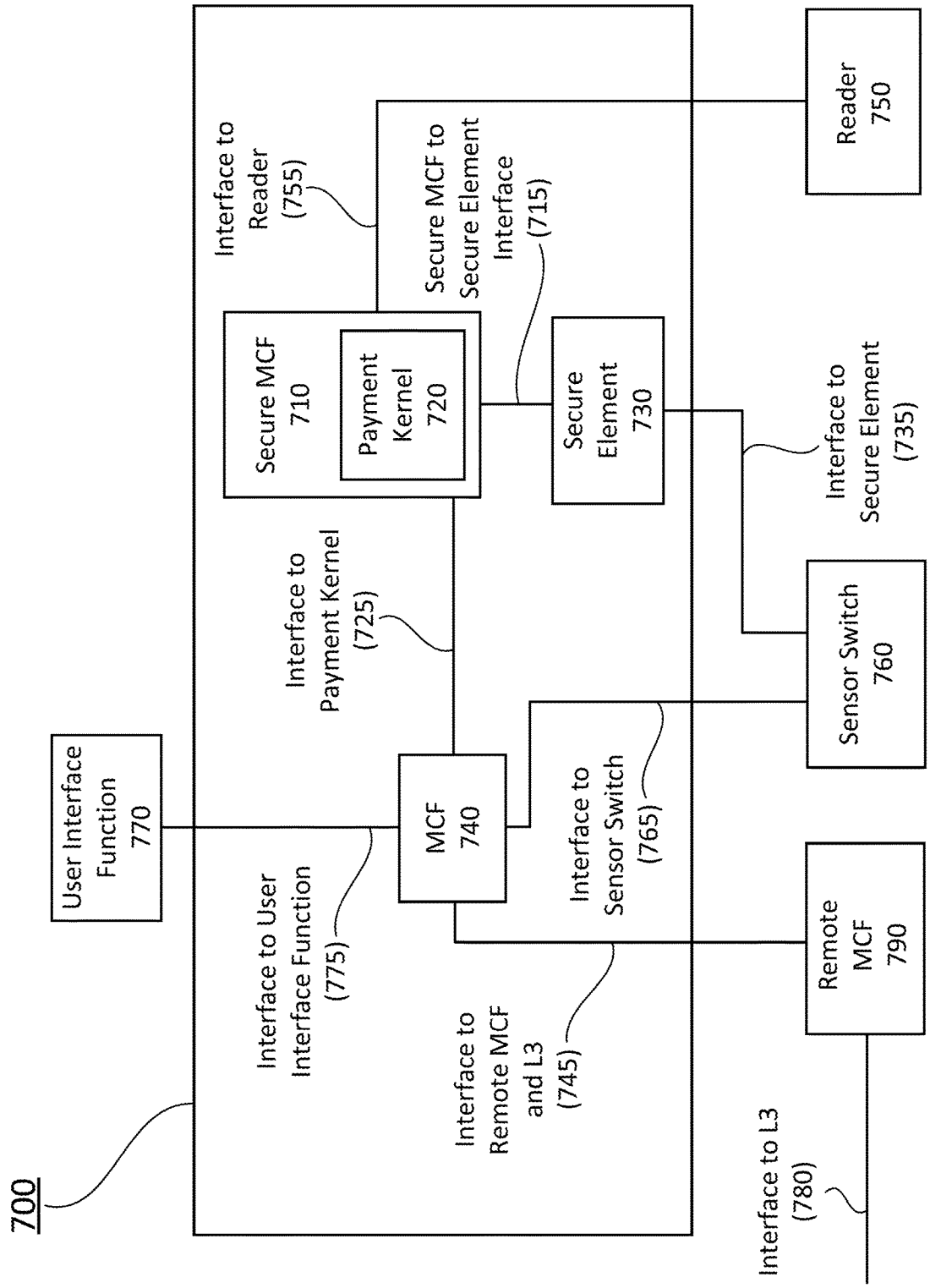
FIG. 7 shows a personal Point of Sale (pPOS) device that can provide for card present e-commerce transactions, where a reader, a user interface function, and a sensor switch are external to the pPOS device, and the pPOS device is interfaced with a certified EMV level 3 (L3) payment application via a remote MCF, in accordance with some example embodiments.

FIG. 7 shows a personal Point of Sale (pPOS) device 700 that can provide for card present e-commerce transactions, where a reader, a user interface function, and a sensor switch are external to the pPOS device, and the pPOS device is interfaced with a certified EMV level 3 (L3) payment application via a remote MCF. The FIG. 7 pPOS device 700 is similar to the FIG. 6 pPOS device 600, except the sensor switch 760 is external to the pPOS device. In particular, FIG. 7 shows that the pPOS device 700 includes all elements and interfaces that are similar to those shown in FIG. 6. For example, FIG. 7 shows that pPOS device 700 includes a secure microcontroller function (MCF) 710, a payment kernel 720 (which is contained in the secure MCF 710), a secure element 730, and a second MCF 740. FIG. 7 also shows that the pPOS device 700 includes an interface 745 to a remote MCF and a certified EMV level 3 payment application (where EMV stands for Europay, MasterCard, and Visa), an interface 725 between the secure MCF 710 and the second MCF 740, an interface 755 between the secure MCF 710 and the reader 750, an interface 735 between the sensor switch 760 and the secure element 730, an interface 775 between the MCF 740 and the user interface function 770, and an interface 715 between the secure MCF 710 and the secure element 730. Again, all of the elements and interfaces shown in FIG. 7 can be matched with a corresponding element and interface shown in FIG. 6, and all matching elements and interfaces have very similar or nearly identical functions and properties.

FIG. 7 shows that pPOS device 700 can be interfaced with an EMV level 3 payment application via a remote MCF 790. In some embodiments, the pPOS device 700 can be configured to interface with the remote MCF 790 using one or more of the following: USB (Universal Serial Bus), audio jack, Bluetooth, WiFi (wireless local area network), NFC (near field communication), near field magnetic induction (NFMI) communication, and any computer network.

FIG. 7 shows that the reader 750 can be external to the pPOS device. In some embodiments, the pPOS device 700 can be configured to perform I/O (input/output) functions with the reader 750 using one or more of the following: USB (Universal Serial Bus), audio jack, Bluetooth, WiFi (wireless local area network), NFC (near field communication), near field magnetic induction (NFMI) communication, a remote MCF, and any computer network.

FIG. 7 shows that the user interface function 770 can be external to the pPOS device. In some embodiments, the pPOS device 700 can be configured to perform I/O (input/output) functions with the user interface function 770 using one or more of the following: USB (Universal Serial Bus), audio jack, Bluetooth, WiFi (wireless local area network), NFC (near field communication), near field magnetic induction (NFMI) communication, a remote MCF, and any computer network.

FIG. 7 shows that the sensor switch 760 can be external to the pPOS device. In some embodiments, the pPOS device 700 can be configured to perform I/O (input/output) functions with the sensor switch 760 using one or more of the following: USB (Universal Serial Bus), audio jack, Bluetooth, WiFi (wireless local area network), NFC (near field communication), near field magnetic induction (NFMI) communication, a remote MCF, and any computer network.

As an example to FIG. 7, the pPOS device 700 can be connected to a computer through a USB connection. Then, in some embodiments, the sensor switch 760 can be a fingerprint reader of the computer. Further, in some embodiments, the user interface function 770 can be a display screen of the computer.

Additionally, like FIG. 6 (e.g., interface 635), FIG. 7 also shows a direct interface 735 between the sensor switch 760 and the secure element 730. In some embodiments, such a configuration to directly route the sensor switch 760 to the secure element 730 can be undesirable for security reasons. Therefore, in some embodiments, the sensor switch 760 can be routed to the secure element 730 via the MCF 740 and/or the secure MCF 710, so that interface 735 is removed.

Figure 8:
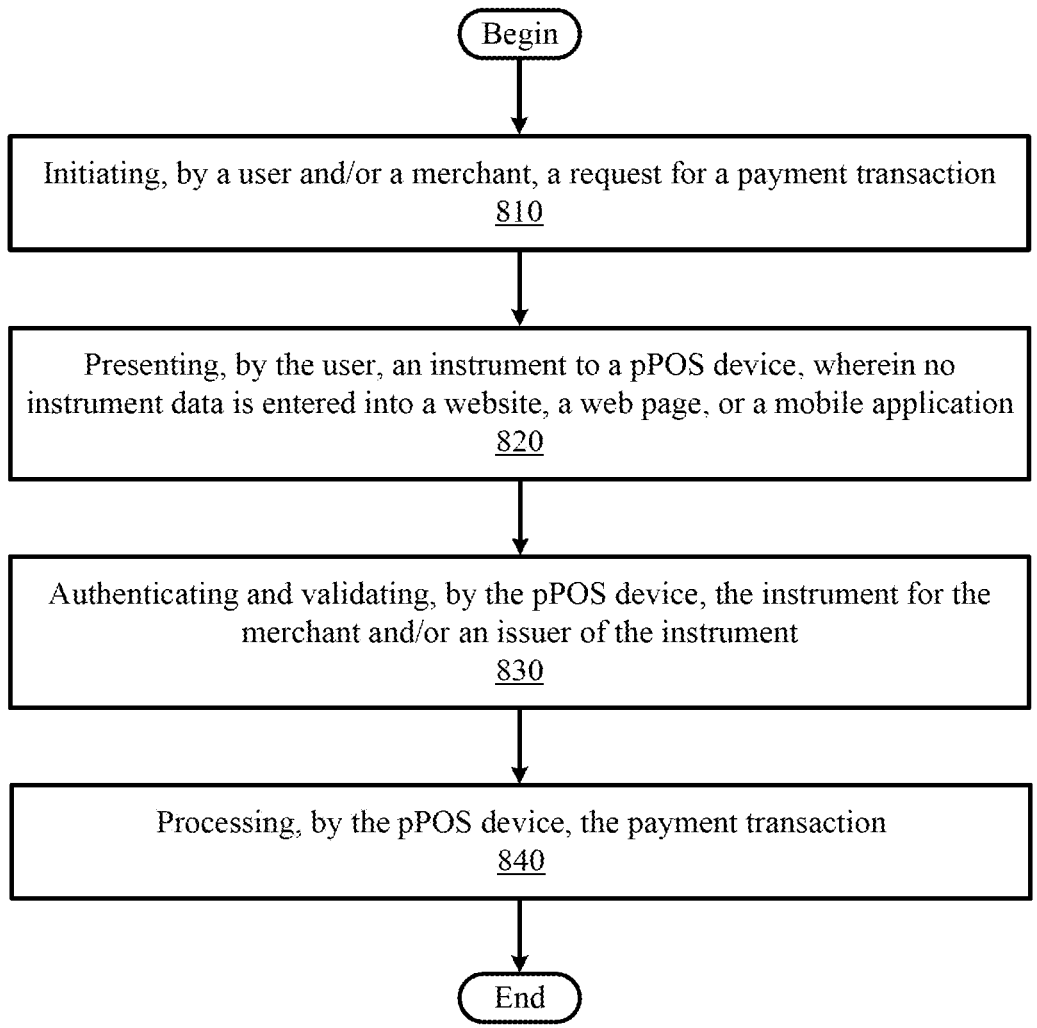
FIG. 8 shows a flow chart of method steps for providing a personal point of sale (pPOS) for card present e-commerce transactions, in accordance with some example embodiments.

FIG. 8 shows a flow chart of method steps for providing a personal point of sale (pPOS) for card present e-commerce transactions, in accordance with some example embodiments. As shown in FIG. 8, the method 800 begins at step 810, where the method initiates, by a user and/or a merchant, a request for a payment transaction. Then, the method proceeds to step 820. In step 820, the method presents, by the user, an instrument to a pPOS device, wherein no instrument data is entered into a website, a web page, or a mobile application. Next, at step 830, the method authenticates and validates, by the pPOS device, the instrument for the merchant and/or an issuer of the instrument. Then, at step 840, the method processes, by the pPOS device, the payment transaction. In some embodiments, the instrument is a payment instrument and/or an identity instrument.

A pPOS device can provide for card present e-commerce transactions. In some embodiments, for a pPOS device, a customer initiates the transaction by presenting the payment and/or identity instrument to the pPOS device. In some embodiments, for a pPOS device, a merchant initiates the transaction from an external system that requires a payment and/or authentication from a user. In some embodiments, the identity instrument enables authentication of a user and is comprised of one or more of the following: a face of the user, a finger of the user, a fingerprint of the user, an iris of the user, a voice of the user, a heart rhythm of the user, a physical attribute of the user.

In some embodiments, the payment instrument can be one of the following: a card form factor, a mobile phone, and a wearable. In some embodiments, the identity instrument is comprised of one or more of the following: a face of the user, a finger of the user, a fingerprint of the user, an iris of the user, a voice of the user, a heart rhythm of the user, a physical attribute of the user.

In this specification, example embodiments have been presented in terms of a selected set of details. However, a person of ordinary skill in the art would understand that many other example embodiments may be practiced which include a different selected set of these details. It is intended that the following claims cover all possible example embodiments.

The various aspects, embodiments, implementations or features of the described embodiments can be used separately or in any combination. Various aspects of the described embodiments can be implemented by software, hardware or a combination of hardware and software.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A device for providing a personal point of sale (pPOS) for card present e-commerce transactions, the device comprising:
    a secure microcontroller function (MCF);
    a reader, the reader configured to read a payment and/or identity instrument;
    a payment kernel, the payment kernel configured to process payment, wherein the payment kernel is contained in the secure microcontroller function (MCF);
    a secure element, the secure element configured to store and execute a payment application, an identification application, and customer validation methods (CVM) for a user of the device;
    a first interface for directly connecting the reader to the secure element to allow processing of payment and authentication of a card by the secure element being read by the reader;
    a sensor switch, the sensor switch configured to initiate and/or terminate a transaction; and
    a second interface for directly connecting the secure element to the sensor switch to allow collection by the sensor switch of user biometric data.

2. The device of claim 1, wherein the secure MCF is configured to provide application and data level encryption and hardware/software tamper detection.

3. The device of claim 1, wherein the reader is a certified EMV level 1 contact and/or contact less reader, wherein EMV stands for Europay, MasterCard, and Visa.

4. The device of claim 3, wherein an antenna of the reader is enabled in a pPOS device enclosure, stand alone, or integrated into an external device, wherein the external device is one of the following:
    a wireless charging device,
    a WiFi (wireless local area network) communication device,
    a Bluetooth or Bluetooth low energy communication device,
    a near field magnetic induction (NFMI) communication device,
    a cellular communication device.

5. The device of claim 1, wherein the user allows the payment kernel to be configured by a merchant and/or merchant acquirer for a merchant payment or a user authentication transaction.

6. The device of claim 5, wherein: the payment kernel is EMV level 2 certified for contact and/or contact less transaction, wherein EMV stands for Europay, MasterCard, and Visa.

7. The device of claim 1, wherein the secure element is configured to execute:
    a secure element application that is used for payment and/or authentication.

8. The device of claim 1, wherein the sensor switch is further configured to collect user authentication data and notify the user of a device status.

9. The device of claim 1 further comprising a user interface function, the user interface function providing a status of the device and a state of the transaction, wherein the user interface function uses one or more of the following interfaces:
    a visual display,
    a light,
    a series of lights,
    an audio interface,
    a haptics interface.

10. The device of claim 1, wherein the secure MCF and/or a second MCF is configured to perform I/O (input/output) functions.

11. The device of claim 7, wherein the secure element application performs authentication using a multi-factor authentication method.

12. The device of claim 8,
    wherein the sensor switch comprises a biometric sensor,
    wherein the biometric sensor is used to collect the user biometric data for enrollment and authentication of:
        the user of the device, and/or
        the transaction from the device to a merchant and/or a merchant acquirer.

13. The device of claim 12, wherein the biometric data is managed by the user of the device.

14. The device of claim 8,
    wherein the sensor switch comprises a touch sensor,
    wherein the touch sensor is used to collect user created data for enrollment and authentication of:
        the user of the device, and/or
        the transaction from the device to a merchant and/or a merchant acquirer.

15. The device of claim 14, wherein a touch pattern is managed by the user of the device.

16. The device of claim 7, wherein the secure element is further configured to execute:
    a second secure element application that is used for customer biometric storage and validation.

17. The device of claim 10, wherein the secure MCF and/or the second MCF is configured to perform I/O (input/output) functions with a certified EMV level 3 (L3) payment application, wherein EMV stands for Europay, MasterCard, and Visa.

18. The device of claim 17, wherein the secure MCF and/or the second MCF is configured to perform I/O (input/output) functions with the certified EMV level 3 (L3) payment application using one or more of the following:
    USB (Universal Serial Bus),
    audio jack,
    Bluetooth,
    WiFi (wireless local area network),
    NFC (near field communication),
    near field magnetic induction (NFMI) communication,
    a remote MCF,
    any computer network.

19. The device of claim 1, wherein a customer initiates the transaction by presenting the payment and/or identity instrument to the device.

20. The device of claim 19, wherein the identity instrument enables authentication of a user and is comprised of one or more of the following:
- a face of the user,
- a finger of the user,
- a fingerprint of the user,
- an iris of the user,
- a voice of the user,
- a heart rhythm of the user,
- a physical attribute of the user.

21. The device of claim 1, wherein a merchant initiates the transaction from an external system that requires a payment and/or authentication from the user.

22. A method for providing a personal point of sale (pPOS) for card present e-commerce transactions, the method comprising:
- initiating, by a user and/or a merchant, a request for a payment transaction;
- presenting, by the user, an instrument to a pPOS device, wherein no instrument data is entered into a website, a web page, or a mobile application;
- authenticating and validating, by the pPOS device, the instrument for the merchant and/or an issuer of the instrument;
- storing, in a secure element, a payment application, an identification application, and customer validation methods (CVM) for the user of the device;
- directly interfacing the secure element to a sensor switch to collect and store biometric data;
- directly interfacing a reader to the secure element to allow processing of payment and authentication of a card being read of the reader;
- processing, by the pPOS device, the payment transaction, wherein the pPOS device comprises a secure microcontroller function (MCF) and a payment kernel,
- wherein the payment kernel is configured to process payment, wherein the payment kernel is contained in the secure microcontroller function (MCF).

23. The method of claim 22, wherein the instrument is:
- a payment instrument, and/or
- an identity instrument.

24. The method of claim 23, wherein the payment instrument is comprised of one or more of the following:
- a card form factor,
- a mobile phone,
- a wearable.

25. The method of claim 23, wherein the identity instrument is comprised of one or more of the following:
- a face of the user,
- a finger of the user,
- a fingerprint of the user,
- an iris of the user,
- a voice of the user,
- a heart rhythm of the user,
- a physical attribute of the user.

26. A device comprising:
- a secure microcontroller function (MCF);
- a payment kernel, the payment kernel configured to process payment, wherein the payment kernel is contained in the secure microcontroller function (MCF);
- a secure element, the secure element configured to store and execute a payment application and an identification application;
- a first interface for directly connecting a card reader to the secure element to allow processing of payment and authentication by the secure element of a card being read by the card reader;
- a sensor switch, the sensor switch configured to initiate and terminate a transaction; and
- a second interface for directly connecting the secure element to the sensor switch to allow collection of user biometric data by the sensor switch.

27. The device of claim 26, wherein the secure MCF and/or a second MCF is configured to perform I/O (input/output) functions.

28. The device of claim 27, wherein the secure MCF and/or the second MCF is configured to perform I/O (input/output) functions with
- a certified EMV level 3 (L3) payment application, wherein EMV stands for Europay, MasterCard, and Visa.

* * * * *